United States Patent
Lopez

(10) Patent No.: US 8,521,082 B1
(45) Date of Patent: Aug. 27, 2013

(54) SIGNAL BOOSTING AND CHARGING SYSTEM FOR ELECTRONIC DEVICES

(76) Inventor: Humberto A. Lopez, Grand Island, NE (US)

( * ) Notice: Subject to any disclaimer, the term of this patent is extended or adjusted under 35 U.S.C. 154(b) by 0 days.

(21) Appl. No.: 13/546,231

(22) Filed: Jul. 11, 2012

(51) Int. Cl.
*H04B 7/15* (2006.01)

(52) U.S. Cl.
USPC .................... 455/11.1; 455/573; 455/571

(58) Field of Classification Search
None
See application file for complete search history.

(56) References Cited

U.S. PATENT DOCUMENTS

| | | | |
|---|---|---|---|
| 5,522,943 A | 6/1996 | Spencer et al. | |
| 5,937,332 A * | 8/1999 | Karabinis | 455/12.1 |
| 6,459,915 B2 | 10/2002 | Nakamura et al. | |
| D505,113 S | 5/2005 | Lam | |
| 7,619,884 B1 | 11/2009 | Gray | |
| 2003/0100351 A1* | 5/2003 | Friesen et al. | 455/571 |
| 2004/0192406 A1 | 9/2004 | Okazaki et al. | |
| 2005/0016579 A1 | 1/2005 | Elazari | |
| 2007/0171888 A1 | 7/2007 | Adams | |
| 2009/0325481 A1* | 12/2009 | Mohebbi | 455/15 |
| 2010/0317413 A1* | 12/2010 | Tan | 455/573 |

OTHER PUBLICATIONS

Meet Dr Kenneth Tong: The brains behind the Vodafone Booster Brolly, Vodafone Social (Official Vodafone UK blog), Jun. 13, 2012, http://blog.vodafone.co.uk/2012/06/13/vodafone-booster-brolly/.*

* cited by examiner

*Primary Examiner* — German Viana Di Prisco

(57) ABSTRACT

A signal boosting and charging system for charging personal electronic devices without an electrical outlet and boosting signals for the personal electronic communication device. The system features a signal booster housed in a signal booster base, a support base, and a solar base. Together, the signal booster base, support base, and solar base form a triangular configuration as viewed from a side to prop up the signal booster base. The system also features solar cells on the solar base for providing power. The system also features an antenna operatively connected to the signal booster. The system may feature one or more USB ports and/or a phone jack.

5 Claims, 3 Drawing Sheets

(ISO View)

(Side Closed View)

(Front View)

(Back View)

(Other Side View)

(Extended View)

SIGNAL BOOSTING AND CHARGING SYSTEM FOR ELECTRONIC DEVICES

BACKGROUND OF THE INVENTION

Many individuals may find themselves out of cellular service in remote areas. The present invention features a signal boosting system for enhancing service to an electronic device such as a cellular phone. The system of the present invention also functions as a charging system to charge electronic devices when electrical outlets are not available.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
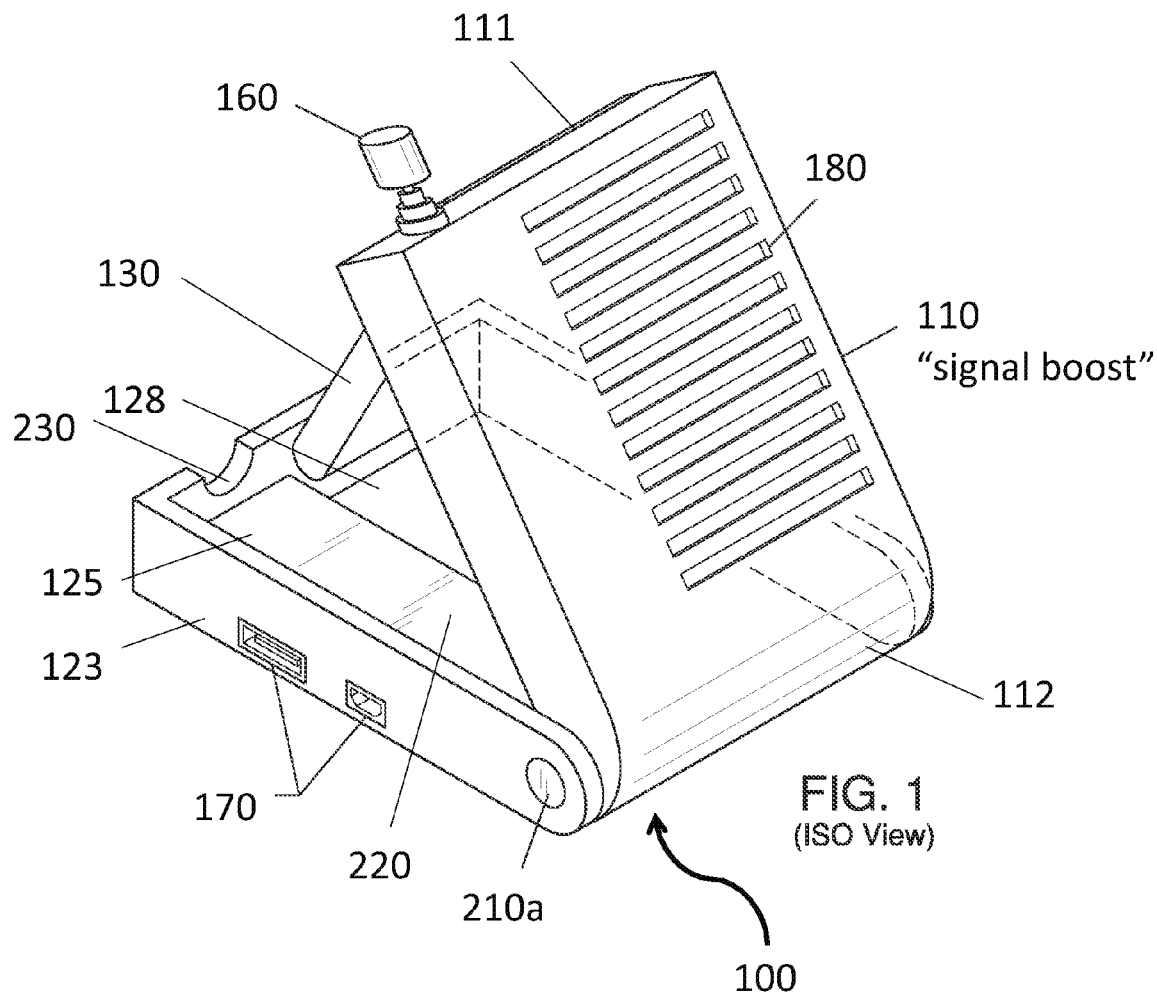
FIG. 1 is a perspective view of the system of the present invention.

Referring now to FIG. 1-6, the present invention features a signal boosting and charging system (100) for boosting signals for a personal electronic communication device (PECD) and/or charging a personal electronic communication device (PECD) without an electrical outlet. The system (100) comprises a signal booster (150) housed in a signal booster base (110). The signal booster base (110) has a first end (111), a hinge end (112), a front surface (115), and a back surface (116). Signal boosters are well known to one of ordinary skill in the art.

Figure 4:
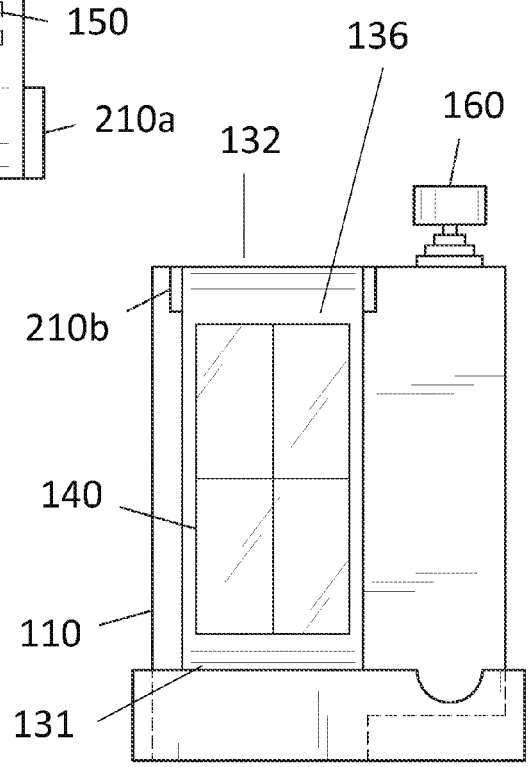
FIG. 4 is a back view of the system of the present invention.

The system (100) further comprises a solar base (130). The solar base (130) functions to provide power via solar cells (140) and to help support the signal booster base (110). The solar base (130) has a first end (131), a hinge end (132), a front surface (135) and a back surface (136). As shown in FIG. 4, the solar cells (140) are disposed on the back surface (136) of the solar base (130). The signal booster (150) disposed in the signal booster base (110 is operatively connected to the solar cells (140). The solar cells (140) provide power to the signal booster (150).

Figure 5:
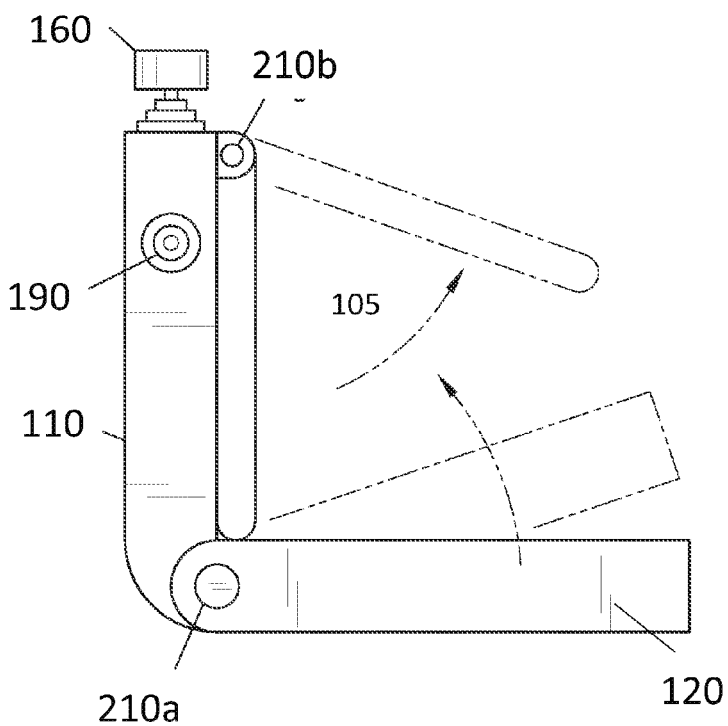
FIG. 5 is a side view of the system of the present invention.

The hinge end (132) of the solar base (130) is pivotally attached to back surface (116) of the signal booster base (110) at or near the first end (111) of the signal booster base (110) via a second hinge (210b). As shown in FIG. 5, the solar base (130) can pivot towards and away from the back surface (116) of the signal booster base (110) between at least a support position and a storage position. In the support position, the solar base (130) is at a first angle (105) with respect to the back surface (116) of the signal booster base (110). In some embodiments, the first angle being between 5 degrees and 180 degrees, e.g., about 10 degrees, about 20 degrees, about 30 degrees, about 40 degrees, about 45 degrees, about 50 degrees, about 60 degrees, about 70 degrees, about 80 degrees, about 90 degrees, about 100 degrees, about 110 degrees, about 120 degrees, about 130 degrees, about 140 degrees, about 150 degrees, about 160 degrees, about 170 degrees, etc. In the storage position, the solar base (130) is at a second angle (105) with respect to the back surface (116) of the signal booster base (110), the second angle being between 0 and 4 degrees, e.g., about 0 degrees, about 1 degree.

Figure 2:
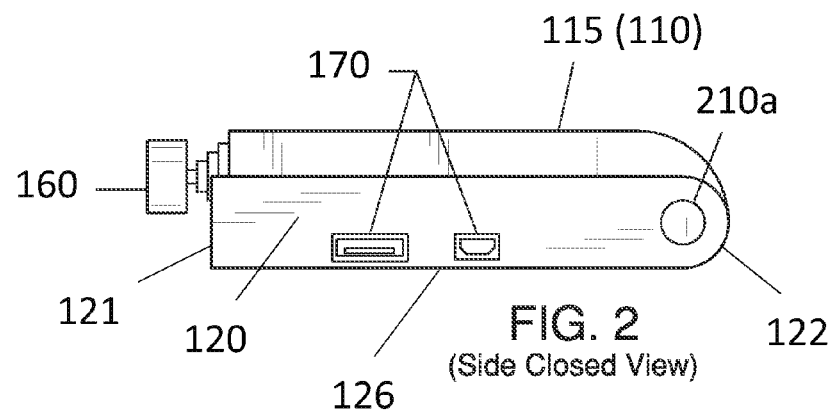
FIG. 2 is a side view of the system of the present invention.
Figure 3:
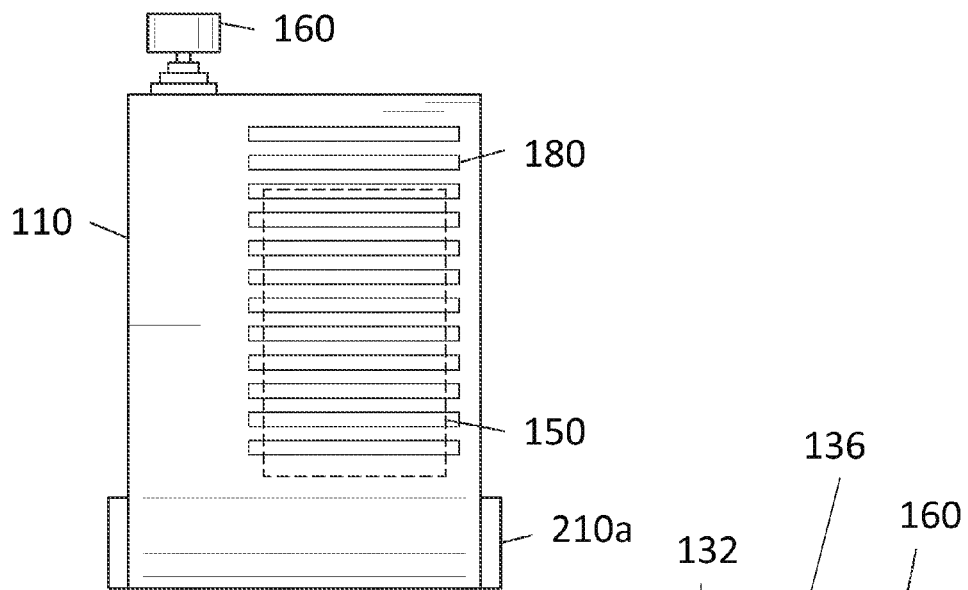
FIG. 3 is a front view of the system of the present invention.
Figure 6:
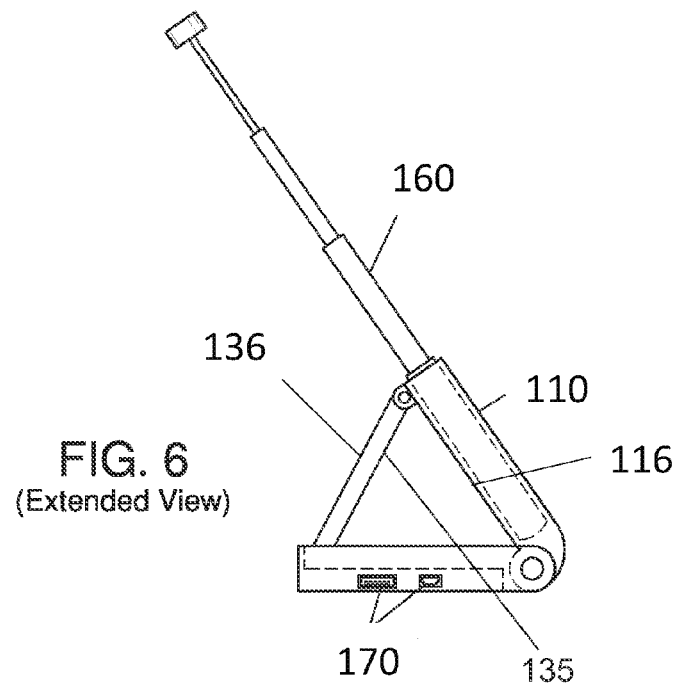
FIG. 6 is a side view of the system of the present invention.

The system (100) further comprises a support base (120) having a first end (121), a hinge end (122), a bottom surface (126), and an inner cavity (128). The inner cavity (128) is accessible via an open top area (125) of the support base (120). The hinge end (112) of the signal booster base (110) is pivotally connected to the hinge end (122) of the support base (120) via a first hinge (210a). The back surface (116) of the signal booster base (110) can pivot towards or away from the inner cavity (128) of the support base (120) between at least a storage position and a propped position. As shown in FIG. 2, in the storage position, the signal booster base (110) and solar base (130) are together housed in the inner cavity (128) of the support base (120) (e.g., the solar base (130) is in the storage position, too). As shown in FIG. 1 and FIG. 6, the first end (131) of the solar base (130) can be temporarily rested within the inner cavity (128) of the support base (120) so as to secure the signal booster base (110) to the propped position. In the propped position, the signal booster base (110), support base (120), and solar base (130) together form a triangular configuration as viewed from the side.

An antenna (160) is disposed on the signal booster base (110). The antenna (160) is operatively connected to the signal booster (150). The antenna (160) is configured to receive first signals from a cellular service tower in a standard manner and to relay said first signals from the cellular service tower to the signal booster (150). The antenna is also configured to receive second signals from the signal booster (150) and relay said second signals from the signal booster (150) to the cellular service tower. The antenna (160) may be a retractable antenna.

In some embodiments, the system (100) further comprises one or more USB ports (170) disposed in the side (123) of the support base (120). The USB port (170) is operatively connected to the solar cells (140). The solar cells (140) provide power to the USB port (170). USB ports are well known to one of ordinary skill in the art.

In some embodiments, the system (100) further comprises a phone jack (190) disposed on the signal booster base (110). In some embodiments, the phone jack (190) is operatively connected to the solar cells (140). In some embodiments, the solar cells (140) provide power to the phone jack (190). In some embodiments, the phone jack (190) is operatively connected to the signal booster (150). In some embodiments, the system (100) further comprises personal electronic communication device (PECD) operatively connected to one or more of the USB port (170), the phone jack (190), or the antenna (160).

As shown in FIG. 1, in some embodiments, vents (180) are disposed in the front surface (115) of the signal booster base (110).

In some embodiments, the system (100) further comprises an indentation (230) disposed in the support (120) for accepting the antenna (160) when the support base (120) is in the storage position and the signal boosting base (110) is in the storage position.

In some embodiments, the system (100) further comprises an USB component housing (220) disposed in the support base (120) adjacent to the USB port (170), the USB component housing (220) houses electronic components of the USB port (170). In some embodiments, the USB component housing (220) is positioned on a side (123) of the support base (120) and the solar base (130) is positioned opposite the side (123) such that when the support base (120) is in the storage position and the signal boosting base (110) is in the storage position, the solar base (130) can be housed within the inner cavity (128) of the support base (120).

As used herein, the term "about" refers to plus or minus 10% of the referenced number.

The disclosures of the following U.S. Patents are incorporated in their entirety by reference herein: U.S. Pat. No. 2007/0171888; U.S. Pat. No. 2005/0016579; U.S. Pat. No. 7,619,884; U.S. Pat. No. 5,522,943; U.S. Pat. No. 2004/0192406; U.S. Pat. No. 6,459,915; U.S. Design Pat. No. D505,113.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A signal boosting and charging system (100) for boosting signals for a personal electronic communication device (PECD) and charging a personal electronic communication device (PECD) without an electrical outlet, said signal boosting and charging system (100) comprising:
    (a) a signal booster base (110) having a first end (111), a hinge end (112), a front surface (115), and a back surface (116);
    (b) a solar base (130) having a first end (131), a hinge end (132), a front surface (135) and a back surface (136), wherein the hinge end (132) of the solar base (130) is pivotally attached to back surface (116) of the signal booster base (110) at or near the first end (111) of the signal booster base (110) via a second hinge (210b), the solar base (130) can pivot towards and away from the back surface (116) of the signal booster base (110) between at least a support position and a storage position, in the support position the solar base (130) is at a first angle (105) with respect to the back surface (116) of the signal booster base (110), the first angle being between 5 degrees and 180 degrees, in the storage position the solar base (130) is at a second angle (105) with respect to the back surface (116) of the signal booster base (110), the second angle being between 0 and 4 degrees;
    (c) a support base (120) having a first end (121), a hinge end (122), a bottom surface (126), and an inner cavity (128) accessible via an open top area (125), wherein the hinge end (112) of the signal booster base (110) is pivotally connected to the hinge end (122) of the support base (120) via a first hinge (210a), the back surface (116) of the signal booster base (110) can pivot towards or away from the inner cavity (128) of the support base (120) between at least a storage position and a propped position, in the storage position the signal booster base (110) and solar base (130) are together housed in the inner cavity (128) of the support base (120), the first end (131) of the solar base (130) can be temporarily rested within the inner cavity (128) of the support base (120) so as to secure the signal booster base (110) to the propped position, in the propped position the signal booster base (110), support base (120), and solar base (130) together form a triangular configuration as viewed from a side;
    (d) solar cells (140) disposed on the back surface (136) of the solar base (130);
    (e) a signal booster (150) disposed in the signal booster base (110), the booster (150) is operatively connected to the solar cells (140), the solar cells (140) provide power to the signal booster (150);
    (f) an antenna (160) disposed on the signal booster base (110), the antenna (160) is operatively connected to the signal booster (150), the antenna (160) is configured to receive first signals from a cellular service tower in a standard manner and to relay said first signals from the cellular service tower to the signal booster (150), the antenna is configured to receive second signals from the signal booster (150) and relay said second signals from the signal booster (150) to the cellular service tower;
    (g) a USB port (170) disposed in a side (123) of the support base (120); the USB port (170) is operatively connected to the solar cells (140), the solar cells (140) provide power to the USB port (170);
    (h) vents (180) disposed in the front surface (115) of the signal booster base (110);
    (i) a phone jack (190) disposed on the signal booster base (110), the phone jack (190) is operatively connected to the solar cells (140), the solar cells (140) provide power to the phone jack (190); and
    (j) a personal electronic communication device (PECD) operatively connected to one or more of: the USB port (170), the phone jack (190), or the antenna (160).

2. The signal boosting and charging system (100) of claim 1, wherein the antenna (160) is retractable.

3. The signal boosting and charging system (100) of claim 1 further comprising an indentation (230) disposed in the support (120) for accepting the antenna (160) when the support base (120) is in the storage position and the signal boosting base (110) is in the storage position.

4. The signal boosting and charging system (100) of claim 1 further comprising an USB component housing (220) disposed in the support base (120) adjacent to the USB port (170), the USB component housing (220) houses electronic components of the USB port (170).

5. The signal boosting and charging system (100) of claim 4, wherein the USB component housing (220) is positioned on a side (123) of the support base (120) and the solar base (130) is positioned opposite the side (123) such that when the support base (120) is in the storage position and the signal boosting base (110) is in the storage position, the solar base (130) can be housed within the inner cavity (128) of the support base (120).

* * * * *